US012671343B2

(12) United States Patent
Forte et al.

(10) Patent No.: US 12,671,343 B2
(45) Date of Patent: Jun. 30, 2026

(54) BIDIRECTIONAL DC-DC CONVERTER AND A METHOD OF CONTROLLING SAID BIDIRECTIONAL DC-DC CONVERTER

(71) Applicant: BORGWARNER ORSENIGO S.R.L., Orsenigo (IT)

(72) Inventors: Pasquale Forte, Orsenigo (IT); Davide Cairoli, Orsenigo (IT); Alessandro Poli, Orsenigo (IT)

(73) Assignee: BORGWARNER ORSENIGO S.R.L., Orsenigo (IT)

( * ) Notice: Subject to any disclaimer, the term of this patent is extended or adjusted under 35 U.S.C. 154(b) by 64 days.

(21) Appl. No.: 18/294,460

(22) PCT Filed: Jul. 29, 2022

(86) PCT No.: PCT/IB2022/057074
§ 371 (c)(1),
(2) Date: Feb. 1, 2024

(87) PCT Pub. No.: WO2023/012628
PCT Pub. Date: Feb. 9, 2023

(65) Prior Publication Data
US 2024/0291391 A1     Aug. 29, 2024

(30) Foreign Application Priority Data
Aug. 2, 2021     (IT) ........................ 102021000020831

(51) Int. Cl.
H02M 3/335 (2006.01)
H02M 3/00 (2006.01)

(52) U.S. Cl.
CPC ......... H02M 3/33584 (2013.01); H02M 3/01 (2021.05); H02M 3/33573 (2021.05)

(58) Field of Classification Search
CPC ............... H02M 3/33584; H02M 3/01; H02M 3/33573; H02M 1/0095
See application file for complete search history.

(56) References Cited

U.S. PATENT DOCUMENTS 9,893,631 B2 *    2/2018    Ishigaki ............ H02M 3/33546

FOREIGN PATENT DOCUMENTS

| CN | 106877676 B | 8/2018 |
| KR | 101314903 B1 | 10/2013 |
| WO | 2021023398 A1 | 2/2021 |

OTHER PUBLICATIONS

International Search Report and Written Opinion, mailed Oct. 11, 2022, from International Application No. PCT/IB2022/057074, 13 pages.

(Continued)

*Primary Examiner* — Kyle J Moody
(74) *Attorney, Agent, or Firm* — Workman Nydegger

(57) ABSTRACT

A bidirectional DC-to-DC converter includes first terminals connected to a direct current source, second terminals connected to a load that can be supplied with direct current, a transformer stage including a primary and a secondary circuit that can be magnetically coupled to each other, a switching stage operatively interposed between the two first terminals and the primary circuit and a rectifier stage operatively interposed between the two second terminals and the secondary circuit. A control unit is configured to drive the switching stage and the rectifier stage. The control unit is configured to switch a first switch of the primary circuit and a second switch of the secondary circuit between an open and a closed condition as a function of the level of power transferred by the transformer stage and/or the direction of the energy flow, to change the topology of the primary circuit and/or the secondary circuit.

5 Claims, 2 Drawing Sheets

(56)  References Cited

OTHER PUBLICATIONS

Wang et al, "Design Considerations of Efficiency Enhanced LLC PEV Charger Using Reconfigurable Transformer", Sep. 1, 2019, vol. 68, No. 9, p. 8642-8651.

Khan et al, "A Multistructure Multimode Three-Phase Dual-Active-Bridge Converter Targeting Wide-Range High-Efficiency Performance", Aug. 6, 2020, vol. 36, No. 3, p. 3078-3098.

* cited by examiner

BIDIRECTIONAL DC-DC CONVERTER AND A METHOD OF CONTROLLING SAID BIDIRECTIONAL DC-DC CONVERTER

BACKGROUND

This invention relates to a bidirectional DC-to-DC converter and a method for controlling said bidirectional DC-to-DC converter.

This invention thus finds application in any power electronics device in which it is necessary to transfer power by modulating the transfer of power as a function of the surrounding conditions.

DESCRIPTION OF THE RELATED ART

The main application for this invention is in the automotive sector, in particular in the design and manufacture of on board charging systems for electrical batteries.

In the context of electric vehicles, in fact, the methods for recharging battery packs requires, downstream of the first rectification of the current performed by the PFC, changing the voltage level to supply different loads, for example high-voltage batteries, for which it is necessary that the voltage coming from the source is raised to adapt it to the current of the batteries.

As known, in any case, both the voltage and/or power level on the source side and those on the load side may, as a function of the type of application, be strongly variable, changing, in some cases the direction of the flow as well.

These issues are generally resolved by partitioning the size of some components of the electrical circuit, making it possible, by means of special switches, to change the capacity, inductance, or resistance of the circuit.

These solutions, in any case, do not make it possible to entirely optimise the efficiency of the converter in the event of sensitive voltage variations, necessarily introducing low-efficiency "operating zones" that, in some applications, are decidedly unwanted.

The purpose of this invention is, thus, to provide a bidirectional DC-to-DC converter and a method for controlling said converter capable of avoiding the drawbacks of the above-mentioned technique.

In particular, the purpose of this invention is to provide a bidirectional DC-to-DC converter and a method for controlling said converter that is highly versatile, able to maintain high efficiency levels as surrounding conditions change.

Said purposes are achieved with a bidirectional DC-to-DC converter and a method for controlling said DC-to-DC converter that have the features of one or more of the following claims.

In particular, the bidirectional DC-to-DC converter comprises two first terminals that are/can be connected to a direct current source and two second terminals that are/can be connected to a load that can be supplied with direct current.

A switching stage, a transformer stage, and a rectifier stage are also provided.

The transformer stage is provided with a primary circuit and a secondary circuit equipped with, respectively, a primary winding and a secondary winding, which can be magnetically coupled.

The primary circuit is preferably connected to the first terminals and the secondary circuit is connected to the second terminals.

It should be noted that, in light of the bidirectional nature of the converter, the definitions "primary" and "secondary" are to be considered conventional, since, depending on the direction of the flow, the power could be transferred in one direction, from the primary to the secondary, or in the other, from the secondary to the primary.

The switching stage is operatively interposed between the two first terminals and the primary circuit of the transformer stage.

This switching stage is preferably configured to receive direct current from the first terminals and to switch it into an alternating current for the purposes of the transformation (there is, in fact, electromagnetic induction only if the magnetic flow that hits the secondary circuit is variable).

The rectifier stage is, instead, operationally interposed between the two second terminals and the secondary circuit of the transformer stage, configured to make the current usable for the direct current load.

It should be noted that, because of the bidirectional nature of the converter, the switching stage and the rectifier stage may reciprocally invert their roles if the current flow is inverted.

BRIEF SUMMARY

According to the invention, the converter also comprises a control unit configured to drive the switching stage and the rectifier stage.

The primary circuit preferably comprises at least one first capacitor, at least one first leakage inductance, and at least one first magnetizing inductance arranged in series with each other, and at least one first switch arranged in parallel with said first capacitor.

In addition, the secondary circuit preferably comprises at least one second capacitor, at least one second leakage inductance, and at least one second magnetizing inductance arranged in series with each other, and at least one second switch arranged in parallel with said second capacitor.

In other words, therefore, the primary circuit and the secondary circuit have an LLC topology with two inductances and a capacitor in series, the latter of which can be bypassed by means of a parallel branch equipped with a switch that can be selectively switched by the control unit.

In this respect, in fact, the control unit is configured to switch the first and second switch between an open and a closed condition as a function of the level of power transferred by the transformer stage in order to change the topology of the primary circuit and/or the secondary circuit.

Advantageously, this system makes it possible to optimise the operational point of the converter across a wider range of input and output voltages and powers of the converter, thus avoiding a very high spread of the switching frequency or a drop in the efficiency of the system; this peculiarity makes it possible, moreover, to make the converter extremely versatile, significantly broadening the possibilities for using and applying it.

The control unit is preferably configured to switch said first and said second switch between an open condition and a closed condition so as to arrange the primary circuit and the secondary circuit in a high power configuration and in a low power configuration.

The high power configuration is set when the power transferred between the first terminals and the second terminals has a value comprised between a first conversion value and the value of a rated power of the converter.

The low power configuration is set when the power transferred between the first terminals and the second terminals has a value lower than said conversion value.

The control unit is also, preferably, configured to switch said first and said second switch between the respective open and closed conditions so as to arrange the primary circuit and the secondary circuit in a transition configuration, different from the high and low power configurations, when the power transferred between the first terminals and the second terminals has a value comprised between the first conversion value and a second conversion value; said conversion value being lower than the first conversion value and higher than zero.

Advantageously, in this way, the converter has a variable topology depending on the power transferred between at least three configurations: one low power configuration, one high-power configuration, and one transition configuration.

The transformer stage also, preferably, has a transformation ratio that varies between at least one first and one second value. The control unit is, thus, configured to change the transformation ratio between the first and the second value as a function of a voltage level across the first and/or second terminals, thus adapting the transmission ratio to the voltage level across the converter.

Advantageously, in this way, the converter is completely multi-modal, able to adapt to the surrounding conditions both in terms of power and voltage, to the benefit of conversion efficiency.

The presence of a variable transformation ratio, for example, may be particularly useful on the HV battery side in an electric or hybrid vehicle, in which, during charging, the voltage may vary by a 2:1 ratio.

BRIEF DESCRIPTION OF THE DRAWINGS

Additional features and advantages of this invention will be clearer from the indicative, and therefore non-limiting, description of one preferred, but not exclusive, embodiment of a bidirectional DC-to-DC converter and a method for controlling said converter, as illustrated in the attached drawings wherein.

DETAILED DESCRIPTION

Figure 1:
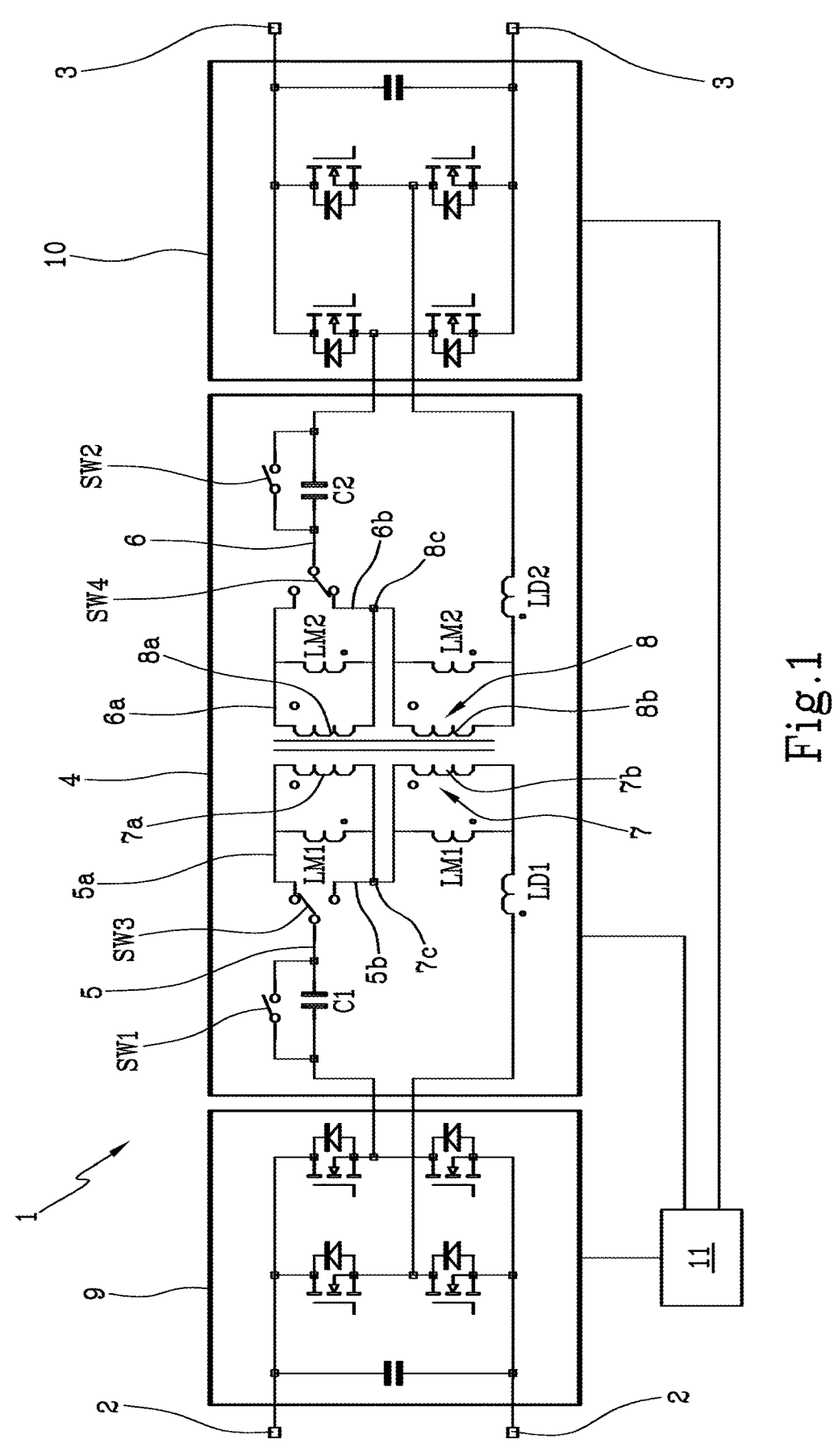
FIG. 1 shows a circuit equivalent to a bidirectional DC-to-DC converter, according to this invention, in a first embodiment.

With reference to the attached figures, reference number 1 indicates a bidirectional DC-to-DC converter according to this invention.

The converter 1 is an isolated converter, or a converter in which the terminals on the input side are not directly connected with the load and the power is transmitted without a direct electrical connection but through an inductive coupling.

Isolated DC-to-DC converters operate, in fact, by converting a direct current source from one voltage to another (sometimes the same), providing for the internal presence of an electrical barrier between the input and output to improve safety.

These converters have their main application, therefore, in all those products in which the voltages in play are high and where it is necessary to ensure users a high safety standard. Think, for example, of systems for recharging electrical vehicles, or medical or industrial equipment.

The converter 1 thus comprises two first terminals 2 that are/can be connected to a direct current source "G" and two second terminals 3 that are/can be connected to a load "L" that can be supplied with direct current.

Since it is bidirectional, the load may, in turn, become a source and the source a load or accumulator.

This mainly happens in automotive applications, for example in electrical or hybrid vehicle battery charges, especially in on board battery chargers, in which it is possible that the battery pack may cede current to the mains or to a load connected upstream of the first terminals 2.

The converter 1 comprises, thus, a switching stage 9, a transformer stage 4, and a rectifier stage arranged in succession.

The transformer stage 4 is provided with a primary circuit 5 and a secondary circuit 6 connected, respectively, to the first terminals 2 and to the second terminals 3.

The primary circuit 5 and the secondary circuit 6 are, respectively, equipped with a primary winding 7 and a secondary winding 8 that can be magnetically coupled.

When the current circulating in one of the windings changes, an electromotive force proportional to the transformation ratio (or loop ratio between the two windings) is induced in the secondary winding 8 of the secondary circuit 6, thus enabling a conversion and change in the output voltage.

The primary circuit 5 comprises at least one first capacitor C1, at least one first leakage inductance LD1, and at least one first magnetizing inductance LM1 arranged in series with each other.

Similarly, the secondary circuit 6 comprises at least one second capacitor C2, at least one second leakage inductance LD2, and at least one second magnetizing inductance LM2 arranged in series with each other.

The switching stage 9 is operatively interposed between the two first terminals 2 and the primary circuit 5 of the transformer stage 4.

This switching stage 9 is preferably configured to receive direct current from the first terminals 2 and to switch it into an alternating current for the purposes of transformation (there is, in fact, electromagnetic induction only if the magnetic flow that hits the secondary circuit is variable).

Figure 2:
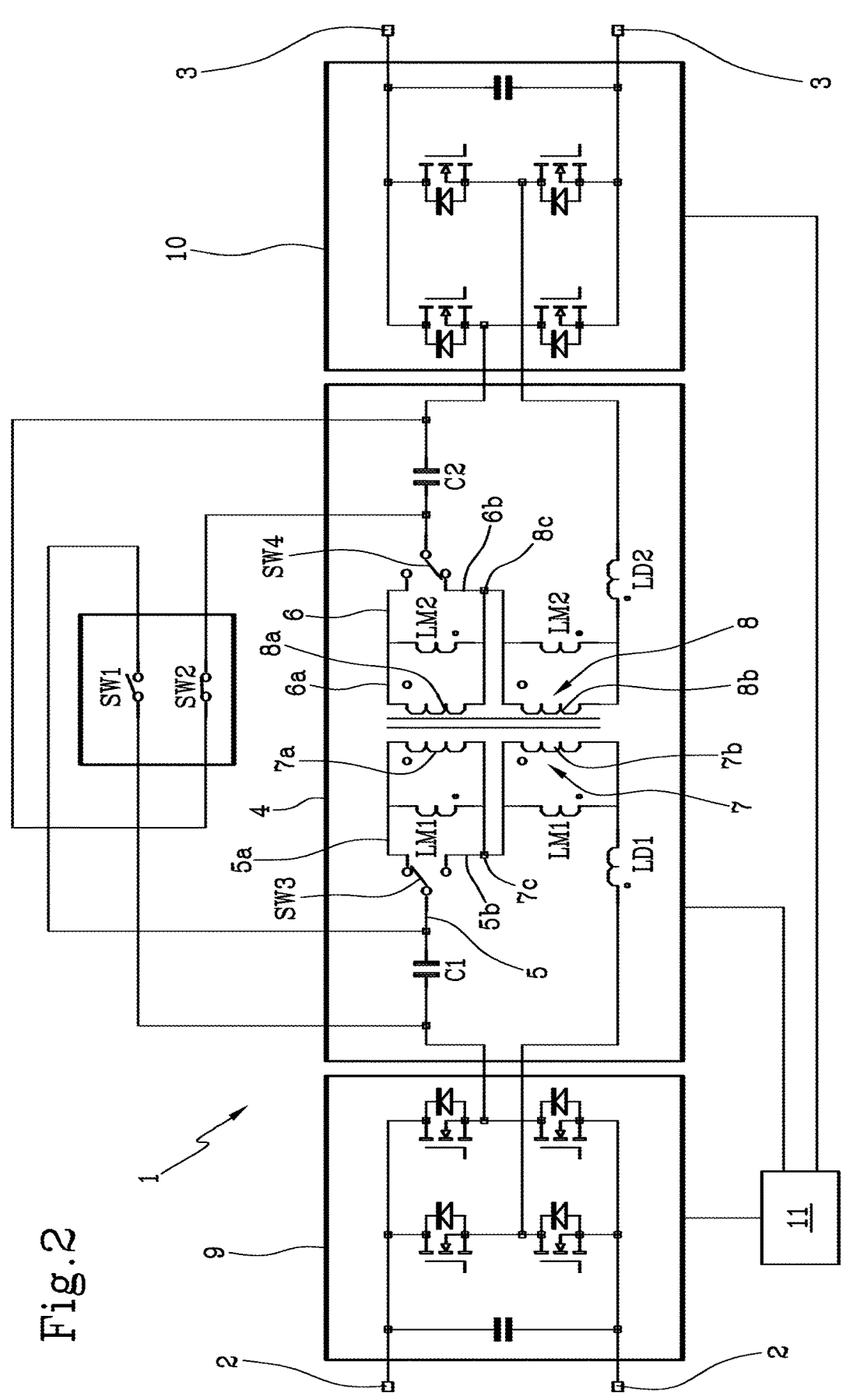
FIG. 2 shows a circuit equivalent to a bidirectional DC-to-DC converter, according to this invention, in a second embodiment.

In the preferred embodiment, illustrated in FIGS. 1 and 2, the switching stage 9 comprises a bridge provided with four switches that can be selectively switched to change the current flow in the primary winding 7.

The rectifier stage 10 is, instead, operatively interposed between the two second terminals 3 and the secondary circuit 6 of the transformer stage 4.

This rectifier stage 10 is configured to make the current usable for the direct current load, rectifying the alternating current induced by the primary.

The rectifier stage 10 also, preferably, comprises a bridge provided with four switches that can be selectively switched to rectify the current flow coming from the secondary winding 8.

It should be noted that, because of the bidirectional nature of the converter 1, the switching stage 9 and the rectifier stage 10 may reciprocally invert their roles if the current flow is inverted.

In this respect, the definitions "primary" and "secondary" are to be considered conventional, since, depending on the direction of the flow, the power could be transferred in one direction, from the primary to the secondary, or in the other, from the secondary to the primary.

The converter 1 also comprises a control unit 11 configured to drive the switching stage 9 and the rectifier stage 10 in order to optimise the transfer of power.

According to one first aspect of the invention, the primary circuit 5 comprises at least one first switch SW1 arranged in parallel to said first capacitor C1.

In other words, the primary circuit 5 comprises at least one branch parallel to said first capacitor C1 and in series to the two magnetizing LM1 and leakage LD1 inductances.

This branch comprises the first switch SW1, which can be selectively switched between an open condition and a closed condition, wherein the primary circuit 5 "cuts" the first capacitor C1.

Similarly, the secondary circuit 6 comprises at least one second switch SW2, arranged in parallel to said second capacitor C2.

Thus, the secondary circuit 6 comprises at least one branch parallel to the second capacitor C2 and in series to the two magnetizing LM2 and leakage LD2 inductances.

This branch comprises the second switch SW2, which can be selectively switched between an open condition and a closed condition, wherein the secondary circuit "cuts" the second capacitor C2.

Advantageously, thus, the primary circuit 5 and the secondary circuit 6 each comprise a bypass branch arranged in parallel to the respective first C1 or second C2 capacitor and selectively drivable to change, in real time, the topology of the transformer stage.

Thus, the control unit 11 is also, preferably, configured to switch the first SW1 and second SW2 switch between an open and a closed condition as a function of the level of power transferred by the transformer stage 4 in order to change the topology of the primary circuit 5 and/or the secondary circuit 6.

Advantageously, this makes it possible to significantly broaden the versatility of the converter, making it possible to maintain high efficiency levels in the presence of strong variability on the source or load side.

In this respect, it should be noted that the first SW1 and the second SW2 switch could be separate elements (FIG. 1) or integrated in a single switching device SWD (FIG. 2) that, by means of a single drive signal, can switch both into the suitable open or closed condition.

The control unit 11 is preferably configured to switch said first SW1 and said second SW2 switch between an open condition and a closed condition so as to arrange the primary circuit 5 and the secondary circuit 6 in at lease one high power configuration and one low power configuration.

More preferably, but not necessarily, the control unit 11 is configured to set the primary circuit 5 and the secondary circuit 6 into a transition configuration that is different from the first and second.

In more detail, the control unit 11 is configured to position the first SW1 and the second SW2 switch in at least one mutual position, defining the high power configuration of the primary circuit 5 and of the secondary circuit 6, when a power transferred between the first terminals 2 and the second terminals 3 has a value ranging between a first conversion value and the value of a rated power of the converter 1.

More preferably, the control unit 11 is configured to position the first SW1 and the second SW2 switch in at least one first position, defining a first high power configuration, when the power transferred between the first terminals 2 and the second terminals 3 has a value comprised between a first conversion value and the value of a rated power of the converter and the energy flows from the primary circuit 5 to the secondary circuit 6.

In addition, the control unit 11 is configured to position the first SW1 and the second SW2 switch in at least one second mutual position, defining a second high power configuration, when the power transferred between the first terminals 2 and the second terminals 3 has a value comprised between a first conversion value and the value of a rated power of the converter and the energy flows from the secondary circuit 6 to the primary circuit 5.

The control unit 11 is also configured to position the first SW1 and the second SW2 switch in a third mutual position, defining the low power configuration of the primary circuit 5 and of the secondary circuit 6, when a power transferred between the first terminals 2 and the second terminals 3 has a value lower than said conversion value.

In addition, the control unit 11 is preferably configured to switch said first SW1 and said second SW2 switch between an open condition and a closed condition so as to arrange the primary circuit 5 and the secondary circuit 6 in a transition configuration, different from the first configuration and the low power configuration.

In other words, the control unit 11 is also configured to position the first SW1 and the second SW2 switch in a fourth mutual position, defining the transition configuration of the primary circuit 5 and of the secondary circuit 6, when the power transferred between the first terminals 2 and the second terminals 3 has a value ranging between the first conversion value and a second conversion value, lower than the first conversion value and greater than zero.

In the preferred embodiment, in the first high power configuration (i.e. the first mutual position) the first switch SW1 is in the open condition and said second switch SW2 is in the closed condition, defining a first LLC topology for the converter 1.

The term LLC identifies the components of the equivalent circuit, i.e. the first leakage inductance LD1, the first magnetizing inductance LM1, and the first capacitor C1.

In the second high power configuration (i.e. the second mutual position) the first switch SW1 is in the closed condition and said second switch SW2 is in the open condition, defining a second LLC topology (or inverted LLC topology) for the converter 1.

In the low power configuration (i.e. the third mutual position) the first switch SW1 and the second switch SW2 are in the closed condition, defining a DAB (Dual Active Bridge) topology for the converter 1.

In the transition configuration, the first switch SW1 and the second switch SW2 are in the open condition, defining a CLLLC topology for the converter, wherein the inductances are the magnetizing inductance (LM1 or LM2 depending on the power transfer direction) and the two leakage inductances LD1, LD2.

Numerically, the first conversion value is preferably comprised between 20% and 50% of the rated power of the converter 1, preferably between 25% and 35% of the rated power of the converter 1.

The second conversion value is, preferably, comprised between 10% and 30% of the rated power of the converter 1, preferably between 15% and 25% of the rated power of the converter 1.

In the preferred embodiment, the first conversion value is 30% of the rated power of the converter 1 and the second conversion value is 20% of the rated power.

According to an additional aspect of the invention, the transformer stage 4 also has a transformation ratio that varies between at least one first and one second value.

In this respect, the control unit 11 is configured to change the transformation ratio between the first and the second value as a function of a voltage level across the first 2 and/or second 3 terminals.

Advantageously, this feature makes it possible to optimise the operating point of the converter across a wider range of in/out voltages of the converter 1, avoiding a very high spread of the switching frequency.

The primary winding 7 of the primary circuit 5 preferably comprises at least one first coil 7a and a second coil 7b arranged in series, between which a first splitting node 7c is interposed.

The primary circuit 5 preferably comprises at least one first 5a and one second charge branch 5b parallel to each other, wherein the first charge branch 5a is connected in series upstream of the first coil 7a, and the second charge branch 5b is connected in series upstream of the first splitting node 7c.

A first selector element SW3 is arranged operationally upstream of said first 5a and second 5b branch.

The first selector element SW3 can be selectively switched at least between a first position, in which it guides the current flow to or from the first coil 7a (i.e. towards the first branch 5a), and a second position, in which it guides the current flow to or from the first splitting node 7c (i.e. towards the second branch 5b).

The control unit 11 is, thus, configured to selectively arrange the first selector element SW3 in the first or second position depending on the voltage level between the first 2 and/or second 3 terminals.

In addition, the secondary winding also, preferably, has a variable number of loops.

In more detail, the secondary winding 8 of the secondary circuit 6 preferably comprises at least a first coil 8a and a second coil 8b arranged in series, between which a second splitting node 8c is interposed.

The secondary circuit 6 comprises at least a first 6a and a second charge branch 6b parallel to each other, wherein the first charge branch 6a is connected in series upstream of the first coil 8a, and the second charge branch 6b is connected in series upstream of the second splitting node 8c.

A second selector element SW4 that can be selectively switched at least between a first position, in which it guides the current flow to or from the first coil 8a (i.e. towards the first branch 6a), and a second position, in which it guides the current flow to or from the second splitting node 8c (i.e. towards the second branch 6b).

In this case too, the control unit 11 is, thus, configured to selectively arrange the second selector element SW4 in the first or second position depending on the voltage level between the first 2 and/or second 3 terminals.

Advantageously, the presence of a transformer stage with the capacity to change the transformation ratio in one direction (primary-secondary) or in the other (secondary-primary) depending on the voltage unbalance between the first terminals 2 and the second terminals 3 makes it possible to maximise the efficiency of the converter.

Advantageous applications of this topology include, for example, the on board chargers for electric or hybrid vehicles, in which the charge level of the battery significantly impacts the voltage level of the load (from 200 to more than 400 V), making a system able to adapt to the variation optimal.

It should also be noted that both the switches SW1, SW2 and the selector elements SW3, SW4 may be defined by switches using any technology.

In the case of applications that prioritise the reduction in losses over switching speed (e.g. battery chargers), the switches and the selector elements may be defined by electromechanical relays.

In contrast, in applications where switching speed is critical, the switches and selector elements could be defined by solid state switches; one example of these applications could be an isolated HV-HV converter for supplying the traction inverter in a hybrid or electric vehicle.

This invention also relates to a method for controlling a bidirectional DC-to-DC converter of the type described up until this point.

Since it is a method for controlling the bidirectional DC-to-DC converter described up until this point, all the structural or operational features already described in relation to the converter 1 are equally applicable, mutatis mutandis, to the method illustrated below.

This method involves monitoring a level of power transferred by the transformer stage 4, both in one direction (primary-secondary) and in the other (secondary-primary).

By means of the control unit 11, the primary circuit 5 and the secondary circuit 6 are arranged in a high power configuration or a low power configuration as the level of said transferred power changes.

The arranging step preferably involves selectively positioning the first switch SW1 and the second switch SW2 respectively in an open or closed condition to arrange the primary circuit 5 and the secondary circuit 6 in a high power configuration (the first or the second, i.e. in the first or second mutual position), when a power transferred between the first terminals 2 and the second terminals 3 has a value ranging between the first conversion value and the value of a rated power of the converter, or in the low power configuration (third mutual position), when the power transferred between the first terminals 2 and the second terminals 3 has a value below said conversion value.

In accordance with what is described above, the arranging step also comprises selectively positioning the first switch SW1 and the second switch SW2 in an open or closed condition (in the fourth mutual position), respectively, in order to also arrange the primary circuit 5 and the secondary circuit 6 in a transition configuration, different from the first configuration and the low power configuration, when the power transferred between the first terminals 2 and the second terminals 3 has a value comprised between the first conversion value and a second conversion value; said conversion value being lower than the first conversion value and higher than zero.

The invention achieves the purposes proposed and entails significant advantages.

In fact, an isolated DC-to-DC converter, which is bidirectional and equipped with a variable topology, is, in fact, highly versatile and able to maintain maximum efficiency including when surrounding conditions change.

Therefore, the possibility of integrating in a single converter both a plurality of topologies and different transmission ratios makes it possible to obtain a multi-modal device with a vast application field and reduced dimensions, as well as one that is simple to manufacture.

The invention claimed is:

1. A method of controlling a bidirectional DC-to-DC converter, wherein said bidirectional DC-to-DC converter comprises:

two first terminals connected to a direct current source;

two second terminals connected to a load that can be supplied with direct current;

a transformer stage provided with a primary circuit and a secondary circuit equipped with a primary winding and a secondary winding, respectively, which can be magnetically coupled to each other; said primary circuit being connected to said first terminals, and said secondary circuit being connected to the second terminals;

a switching stage operatively interposed between the two first terminals and the primary circuit of the transformer stage;

a rectifier stage operatively interposed between the two second terminals and the secondary circuit of the transformer stage;

a control unit configured to drive the switching stage and the rectifier stage;

characterised in that:

said primary circuit comprises at least a first capacitor, at least a first leakage inductance (LD1) and at least a first magnetizing inductance (LM1) arranged in series with each other, and at least a first switch (SW1) arranged in parallel with said first capacitor (C1);

said secondary circuit comprises at least a second capacitor (C2), at least a second leakage inductance (LD2) and at least a second magnetizing inductance (LM2) arranged in series with each other, and at least a second switch (SW2) arranged in parallel with said second capacitor (C2);

and in that said control unit is also configured to switch the first switch (SW1) and the second switch (SW2) between an open and a closed condition as a function of a level of power transferred by the transformer stage and/or a direction of an energy flow, in order to change a topology of the primary circuit and/or the secondary circuit, wherein the control unit is configured to switch said first switch (SW1) and said second switch (SW2) between said open condition and said closed condition so as to arrange the primary circuit and the secondary circuit in:

a first high power configuration, when a power transferred between the first terminals and the second terminals has a first value comprised between a first conversion value and a value of a rated power of the converter, with a first energy flowing from the primary circuit to the secondary circuit, a second high power configuration, when the power transferred between the first terminals and the second terminals has a second value comprised between the first conversion value and the value of the rated power of the converter, with a second energy flowing from the secondary circuit to the primary circuit, at least one low power configuration, when the power transferred between the first terminals and the second terminals has a third value lower than said first conversion value, in a transition configuration, different from the first and second high power configurations and from the low power configuration, when the power transferred between the first terminals and the second terminals has a fourth value comprised between the first conversion value and a second conversion value, said second conversion value being lower than the first conversion value and higher than zero, wherein:

said first high power configuration provides that the first switch (SW1) is in the open condition and said second switch (SW2) is in the closed condition, defining a first LLC topology for the converter;

said second high power configuration provides that the first switch (SW1) is in the closed condition and said second switch (SW2) is in the open condition, defining a second LLC topology for the converter;

said low power configuration provides that the first switch (SW1) and the second switch (SW2) are in the closed condition, defining a DAB topology for the converter;

said transition configuration provides that the first switch (SW1) and the second switch (SW2) are in the open condition, defining a CLLC topology for the converter, said method comprising steps of:

monitoring a level of power transferred by the transformer stage; and arranging the primary circuit and the secondary circuit in the first high power configuration or the second high power configuration or the low power configuration with a change in the level of power transferred.

2. The bidirectional DC-to-DC converter according to claim 1, wherein:

said first conversion value is comprised between 20% and 50% of the rated power of the converter, preferably between 25% and 35% of the rated power of the converter;

said second conversion value is comprised between 10% and 30% of a rated power of the converter, preferably between 15% and 25% of the rated power of the converter.

3. The bidirectional DC-to-DC converter according to claim 1, wherein said transformer stage has a transformation ratio varying between at least a first and a second value; said control unit being configured to modify the transformation ratio between the first and the second value as a function of a voltage level across the first and/or second terminals.

4. The bidirectional DC-to-DC converter according to claim 3, wherein the primary winding of the primary circuit comprises at least a first coil and a second coil arranged in series, between which a first splitting node is interposed and wherein the primary circuit comprises:

at least a first and a second charge branch parallel to each other, wherein the first charge branch is connected in series upstream of the first coil, and the second charge branch is connected in series upstream of the first splitting node;

a first selector element (SW3) that can be at least selectively switched between a first position, in which it guides a current flow to or from the first coil, and a second position, in which it guides the current flow to or from the first splitting node.

5. The bidirectional DC-to-DC converter according to claim 4, wherein the secondary winding of the secondary circuit comprises at least a first coil and a second coil arranged in series, between which a second splitting node is interposed and wherein the secondary circuit comprises:

at least a first and a second charge branch parallel to each other, wherein the first charge branch is connected in series upstream of the first coil, and the second charge branch is connected in series upstream of the second splitting node;

a second selector element (SW4) that can be at least selectively switched between a first position, in which it guides the current flow to or from the first coil, and a second position, in which it guides the current flow to or from the second splitting node.

* * * * *